(12) United States Patent
Rakoczi

(10) Patent No.: US 11,313,347 B2
(45) Date of Patent: Apr. 26, 2022

(54) SCALABLE WIND POWER STATION

(71) Applicant: Viktor Rakoczi, Immenstaad am Bodensee (DE)

(72) Inventor: Viktor Rakoczi, Immenstaad am Bodensee (DE)

(*) Notice: Subject to any disclaimer, the term of this patent is extended or adjusted under 35 U.S.C. 154(b) by 0 days.

(21) Appl. No.: 17/142,056

(22) Filed: Jan. 5, 2021

(65) Prior Publication Data

US 2021/0207577 A1 Jul. 8, 2021

(30) Foreign Application Priority Data

Jan. 8, 2020 (DE) ................. 10 2020 000 063.0

(51) Int. Cl.
*F03D 3/00* (2006.01)
*F03D 9/25* (2016.01)
*F03D 3/02* (2006.01)
*H02K 7/18* (2006.01)
*F24S 20/60* (2018.01)
*F03D 9/45* (2016.01)

(52) U.S. Cl.
CPC ............... *F03D 3/005* (2013.01); *F03D 3/02* (2013.01); *F03D 9/25* (2016.05); *F03D 9/45* (2016.05); *F24S 20/60* (2018.05); *H02K 7/183* (2013.01); *F05B 2220/706* (2013.01); *F05B 2220/708* (2013.01)

(58) Field of Classification Search
CPC ... F03D 3/005; F03D 3/02; F03D 9/45; F03D 9/25; H02K 7/183; F24S 20/60; F05B 2220/708; F05B 2220/706
USPC ..................................................... 290/44, 55
See application file for complete search history.

(56) References Cited

U.S. PATENT DOCUMENTS

| | | | |
|---|---|---|---|
| 1,697,574 A * | 1/1929 | Savonius ............... | F03D 3/007 416/110 |
| 6,097,104 A * | 8/2000 | Russell .................. | F03D 80/70 290/54 |
| 7,344,353 B2 * | 3/2008 | Naskali .................. | F03D 3/061 415/4.2 |
| 8,487,463 B2 * | 7/2013 | Ho ......................... | F03D 9/007 290/44 |
| 8,739,533 B2 * | 6/2014 | Yogev .................... | F01D 1/026 60/641.12 |
| 10,443,570 B2 * | 10/2019 | Coffman ................ | F03D 13/20 |

(Continued)

FOREIGN PATENT DOCUMENTS

DE 10 2011 107 590 A1 1/2013
JP S57173572 A 10/1982

*Primary Examiner* — Charles Reid, Jr.
(74) *Attorney, Agent, or Firm* — Walter Ottesen, P.A.

(57) ABSTRACT

A turbine assembly includes a wind turbine defining a first axis as a vertical axis of rotation, an electric generator operatively connected to the wind turbine and configured to generate electrical power from rotational energy of the wind turbine. The wind turbine includes a first scoop and a second scoop conjointly defining a common interface plane and the scoops are displaceable relative to each other. The first and second scoops are arranged along a second axis running transversely to the first axis. A linear drive mechanism interconnects the first and second scoops for displacing the first and second scoops relative to each other along the second axis and the common interface plane. A control is connected to the linear drive mechanism for controlling the relative displacement of the first and second scoops.

12 Claims, 6 Drawing Sheets

(56) References Cited

U.S. PATENT DOCUMENTS

| | | | | |
|---|---|---|---|---|
| 2008/0042446 | A1* | 2/2008 | Kurtz | B63J 3/04 |
| | | | | 290/55 |
| 2010/0034649 | A1* | 2/2010 | Taylor | F03B 17/061 |
| | | | | 415/208.1 |
| 2010/0060010 | A1* | 3/2010 | Gaportsin | F03G 6/045 |
| | | | | 290/55 |
| 2010/0129193 | A1* | 5/2010 | Sherrer | F03D 3/0427 |
| | | | | 415/1 |
| 2011/0232630 | A1* | 9/2011 | Tsao | F24S 90/00 |
| | | | | 126/600 |
| 2011/0250069 | A1* | 10/2011 | Quintal | F03D 3/064 |
| | | | | 416/111 |
| 2012/0032447 | A1* | 2/2012 | Bang-Moeller | F03D 3/02 |
| | | | | 290/54 |
| 2012/0080884 | A1* | 4/2012 | Gagnon | F03D 3/0436 |
| | | | | 290/55 |
| 2013/0119662 | A1* | 5/2013 | Thacker, II | F03D 3/0472 |
| | | | | 290/44 |
| 2013/0313834 | A1* | 11/2013 | Choi | F03D 3/02 |
| | | | | 290/55 |
| 2014/0023500 | A1* | 1/2014 | Rubio | F03D 3/0418 |
| | | | | 416/24 |

* cited by examiner

SCALABLE WIND POWER STATION

CROSS REFERENCE TO RELATED APPLICATION

This application claims priority of German patent application no. 10 2020 000 063.0, filed Jan. 8, 2020, the entire content of which is incorporated herein by reference.

FIELD OF THE INVENTION

The present disclosure concerns the generation of electric energy. Specifically, the disclosure concerns an electrical power station for a building.

BACKGROUND OF THE INVENTION

A modern commercial building may have significant demands for electric power. Power may be drawn from an electrical power grid which is traditionally fed by one or more centralized power generators. Sometimes an electric power grid is not reliable or power that can be drawn from it may be limited. The building can be made more self-sufficient by equipping it with a local power generator, such as a photovoltaic solar system or a wind turbine.

A solar system may suffer from low efficiency in elevated temperatures or if a solar collector is not pointed directly at the sun. Sometimes efficiency may be improved by auto tracking, but this may introduce complex machinery that may require energy or maintenance. A traditional wind turbine may include a large rotor which can present danger to birds. Additionally, such a rotor is not always considered aesthetically pleasing on a building.

SUMMARY OF THE INVENTION

It is therefore an object of the invention to provide an improved turbine assembly and system of turbine assemblies for harvesting sustainable energy for a building.

According to a first aspect of the present invention, a turbine assembly includes a wind turbine with a vertical axis of rotation; and an electric generator that is adapted to generate electrical power from rotational energy of the wind turbine. In this, the wind turbine is adapted to be mounted along a vertical corner of a building.

It has been realized that a building, especially a tall building, may have corners around which surrounding wind may flow with elevated speed. The building may disturb the air flow of natural wind and focus it. At a corner of the building, the wind may be compressed and decompressed when flowing around it. Thus a density of energy in the compressed or accelerated air may be increased and power yield of a turbine harvesting the power may be increased. The turbine itself may be compact in size and shaped in accordance with available space at the building. By attaching the vertically running turbine in the area of a corner of a building, the turbine may be optically integrated into the building, thereby improving user acceptance. Turbine assembly maintenance may be simplified as all parts of the turbine may be accessible from the building. On some buildings, provided outside service elevators intended for e.g. window cleaning may be used for installation and/or maintenance of the turbine assembly.

A diameter of the turbine may be relatively small, suiting it for use as an architectonic feature. Turbine diameter may for instance be in the range of ca. 2 m or less, preferably ca. 1 m or less. An attack surface of the turbine may still be considerable if the building is tall. The building may for instance include a tower or a skyscraper. For the purposes of this document, a skyscraper may be considered a continuously habitable high-rise building that has over 40 floors and is taller than about 150 m.

The turbine is preferred to be of the Savonius type. Such a turbine may have two or more scoops or aerofoils in which wind may be caught. This turbine type may integrate particularly well into the building. Generally, the turbine assembly may be attached to a traditional building corner or the building corner may be adapted to receive the turbine assembly, for instance by providing a vertically elongated recess into which the turbine assembly may be partially inserted.

The turbine may include a first and a second scoop and a relative displacement of the scoops along an axis that runs perpendicular to the axis of rotation is preferred to be controllable. The size of an effective area where wind may enter into each scoop may be controlled by laterally shifting the scoops with respect to each other. This way, an amount of wind energy that is converted to electric energy may be controlled mechanically. Shifting is preferred to occur symmetrically so that the turbine's center of mass remains close to the vertical axis of rotation, independent of the relative position of the scoops. The displacement may be reduced to zero such that the scoops form a tube wherein no significant wind may enter or leave the tube radially. In one further embodiment, the displacement may be controlled to be anywhere in a range that includes positive and negative values. This feature may be used to control the turbine's sense of rotation in the wind.

The turbine may be of helicoid shape. The helical blades or aerofoils may be arranged such that a torque provided by the turbine is independent of an angular position of the turbine around the axis of rotation. The turbine may run more silently and cause less vibrations. Each blade may be curved around the axis by a predetermined angle. Curving angles of the blades may be identical and a sum of the curving angles of all blades may add up to a number that is an integer multiple of 360°. For instance, the turbine may include three blades, each of which may be curved around 120°; or the turbine may include eight blades, each of which may be curved around 90°. Other combinations are also possible.

Especially with the blades in helicoid shape, the turbine may be adapted to be propelled by either wind moving parallel to its axis of rotation or wind moving perpendicular to the axis. This may enable different modes of operation for the turbine. In a first mode, which will herein be called horizontal mode or mode A, wind moving in a lateral direction, essentially horizontal or in a direction perpendicular to the axis of rotation, may be caught in the blades, thus turning the turbine. In a second mode, which will herein be called vertical mode or mode B, air moving essentially vertically, along the axis of rotation, may be caught in the blades and set the turbine in motion. Both modes may be partially applicable at the same time, for instance if rising or falling wind hits the turbine.

On each turbine assembly, the generator may be disposed coaxially to the turbine and is preferably shaped aerodynamically, such as to impose little resistance to vertical and/or horizontal wind. The generator may also be disposed on one side of the turbine assembly, preferably in proximity to the building, and rotational energy may be transferred mechanically from the turbine to the generator. To gain electrical power a gear box between rotor and generator may be employed in order to increase the rotational speed of the generator. The voltage output of the generator thus can be increased. An alternative embodiment, in which the rotational speed of the generator is decreased by the gear box, is also possible.

A system with a turbine assembly that is adapted for both horizontal and vertical modes of operation may include a first screen that is adapted to shield wind to or from the turbine in a radial direction, wherein the first screen is preferred to be moveable around the vertical axis of rotation. The screen may also be called a shade. The screen extends in a direction parallel to the axis of rotation and is further preferred to be bent along a lateral surface of the rotating turbine, so that a vertical gap between the screen and a turbine blade is minimized. The screen may be thin in a radial direction and be fabricated from sheet material like sheet metal or sheet plastics. The first screen may be controlled to guide horizontal wind into or out of the turbine. A gap between the building and the screen may be varied in width, thereby allowing variable amounts of wind into or out of the turbine. Turbine operation may thus be adapted to prevalent wind speed or direction.

The turbine assembly may also include a second screen that is adapted to shield wind to or from the turbine in a predetermined radial direction. The second screen may be fixed and the first screen may be controlled relative to the second screen. A gap between the first and second screens may be variable in size and orientation with respect to the axis of rotation. In another preferred embodiment more than two fixed or moveable screens may be disposed around the turbine, so that width and orientation of more than one gap may be controllable.

In a configuration with at least two screens, at least one of which is moveable around the axis of rotation, the at least one moveable screen may be operated such that wind to or from the turbine is blocked in all radial directions. The screens may form a tube or chimney in which air may move vertically. The turbine may be adapted to be propelled by wind travelling vertically in the chimney. The screens may thus be configured to allow for a horizontal mode of operation and a vertical mode of operation. Depending on prevalent wind conditions, the turbine assembly may be configured for optimized energy yield.

The screen may be adapted to collect solar radiation such as to heat air flowing vertically inside of the screen. The screen may include a highly heat conductive material and may have a dark color on the outside and/or on the inside. Alternatively, the screen may be transparent and an element inside the screen may be of dark color. Air inside the chimney that is formed through the shade may be heated with solar power, thus increasing its flowing speed. Electric power yield of the system may be increased.

A turbine in the turbine assembly may be adapted to be rotated around the axis of rotation such that its disturbance of vertical wind is minimized. The turbine may especially be rotated in the direction it would be turned by a rising air stream. Turning speed may be chosen so that aerodynamic friction on the turbine's aerofoils is minimised. For this, rotational speed may be adapted to vertical wind speed. Rotation may be caused with an active mechanism on the basis of externally supplied energy, for instance by using the generator as a motor for turning the turbine. In another embodiment, rotation may be caused by a passive mechanism that operates on wind power. To this end, there may be a member attached to the turbine, the member being shaped in a profile such that the vertically rising stream of air causes a force in circumferential direction on the turbine. The member may be moveable according to the mode the turbine is operated in so that it causes reduced air disturbance. There may be a vertical position of the member when the turbine is operated in vertical mode and a horizontal position for when the turbine is operated in horizontal mode. In horizontal mode, the member may act as stiffening for one of the turbine aerofoils.

There may be a wind chamber, the wind chamber having a wall or roof that is adapted to collect solar radiation for heating air in the chamber. The wind chamber may include an air inlet and an air outlet, the outlet leading to a lower end of the turbine assembly. It is preferred that the outlet and the inlet are disposed at opposing ends of the wind chamber. Inlet and outlet may be on similar vertical heights, so that air flow inside the chamber is chiefly horizontal. The inlet may be any shape and size and there may be more than one inlet. In a first embodiment, the wall or roof may be transparent and an inside of the wind chamber may be colored darkly so that solar radiation passes the wall or roof and heats the inside, which may transfer its heat to air flowing from the inlet to the outlet. In a second embodiment, the wall or roof may be of a thermally conductive material, and it may be colored darkly on the outside and optionally also on the inside. The chamber may be shaped such as to maximise conversion of solar power to heated air. For this, the chamber may be large and flat with one of the larger sides being adapted to collect solar radiation.

According to a second aspect of the present invention, a turbine system includes a plurality of wind turbine assemblies described herein, the turbine assemblies being stacked vertically to a column. The proposed turbine system may be scaled by adding or removing turbine assemblies to or from a column. Columns of different height may be installed on different corners of a building as required.

Screens between vertically adjacent turbine assemblies may be vertically sealed using a dynamic sealing. The sealing may include a toroidal member that may be inflated so that it seals a lower screen against an upper screen, or deflated so that it permits rotational movement of one of the screens. Through use of the sealing a chimney effect in a stack of turbine assemblies may be amplified.

In vertical operation it can be advantageous to not harvest energy with all of the generators of the column in order not to disrupt vertical air flow too much. A turbine assembly's generator may be disengaged mechanically from its turbine, e.g. with a clutch, or electrically, e.g. by not energizing its coils so that its rotational resistance is minimized. In yet another embodiment, one turbine in or on top of a stack of turbines is adapted to catch vertical wind only. This turbine may be of any desired type and it is preferred that this vertical turbine leaves no hole for vertical wind in its middle.

Turbines between vertically adjacent turbine assemblies in the system may be mechanically linked so that they may rotate with identical speeds, or disengaged to run independently. Coupling between two turbines may be controllable, for instance through use of a mechanical clutch. As horizontal wind tends to blow stronger in higher altitudes, coupled operation of all turbines may be undesirable in horizontal mode of operation. Turbines of a group of vertically adjacent turbine assemblies may be coupled, but run freely from a turbine next to the group. More than one group may be configured in one column. Turbine coupling may be configurable while the system is running. For instance, for 12 turbine assemblies there may be groups of 4-4-4 turbine assemblies if wind speeds on bottom and top do not differ much, and groups of 2-2-4-4 turbine assemblies if they do.

According to a third aspect of the present invention, a method for operating a turbine assembly described herein includes steps of determining a horizontal wind speed and of moving the first screen so that the turbine efficiently catches the wind. Energy yield of the turbine assembly may be optimized. In case of strong winds, the turbine assembly may be protected from excessive forces.

The method may be executed on a control means which may include a programmable microcomputer or microcontroller. The method may be represented as a computer program product with program code means. The computer program product may be stored on a computer readable media. Features or advantages of the method may be applicable to the system described herein and vice versa.

The method may also include a step of moving the second screen such that the turbine efficiently catches the wind. A gap between the two screens may be controlled such that wind is caught well by the turbine.

In another preferred embodiment of the method, a solar irradiation is determined and the first and/or second screens are moved such that wind to or from the turbine is blocked in all radial directions and the turbine is controlled to be propelled by vertical wind. The turbine may be operated in horizontal mode if horizontal winds are strong and irradiation is low, and in vertical mode if horizontal winds are weak and irradiation is high. Generally, a mode of operation may be chosen that maximises energy yield. The mode of operation may also be set according to other factors. For instance, vertical mode may be assumed when a storm is raging, or the wind carries excessive debris that might hit and damage a turbine blade.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
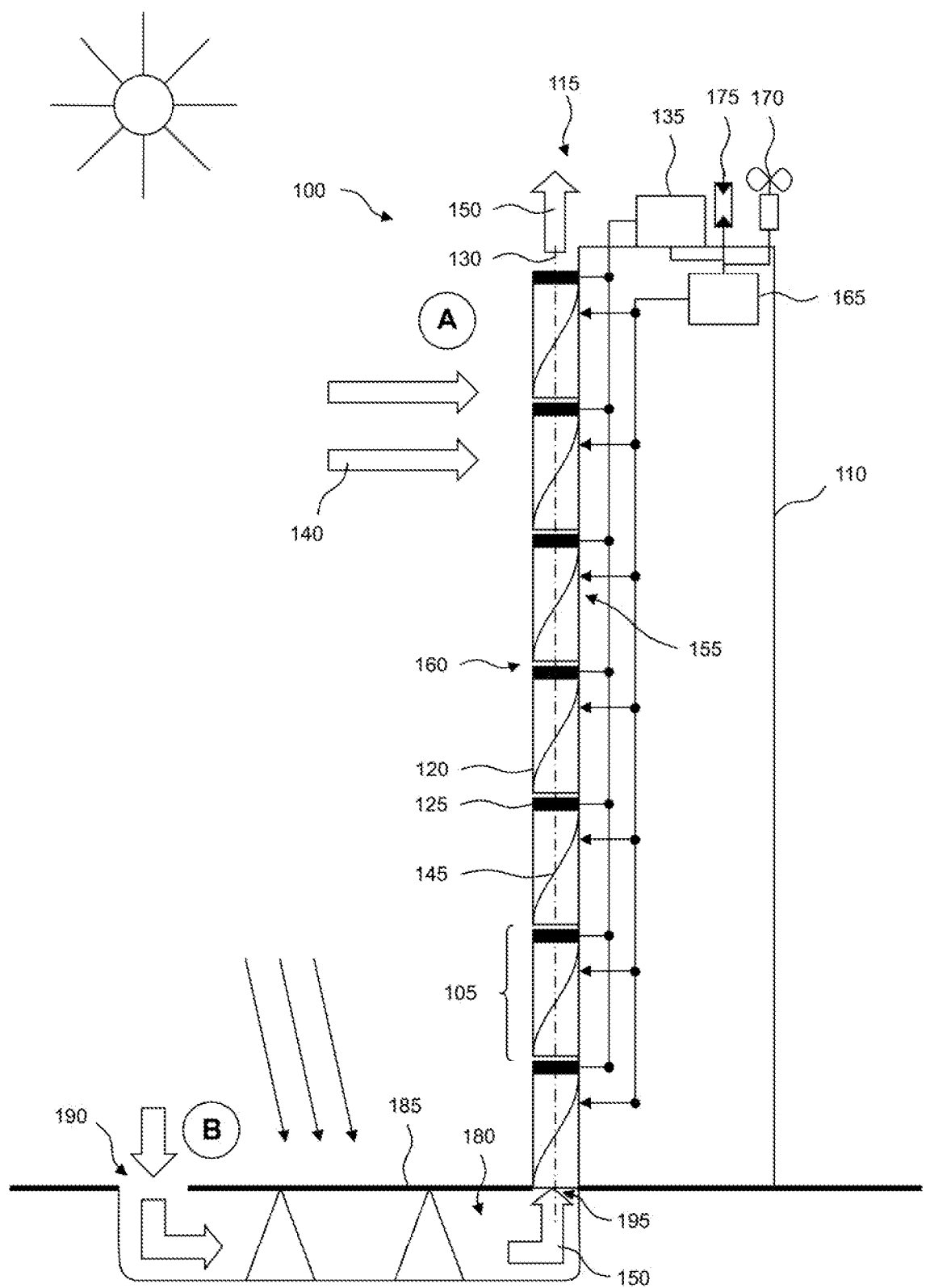
FIG. 1 shows an exemplary system for harvesting wind energy.

FIG. 1 shows a system 100 for harvesting wind energy. The system 100 includes one or more turbine assemblies 105 which are attached to a building 110, preferably at a corner thereof. Several turbine assemblies 105 may be stacked into one column 115. In the column 115 adjacent turbine assemblies 105 may be disposed along a straight line and in relative proximity vertically, allowing air to flow vertically through the turbine assemblies 105.

A turbine assembly 105 includes a turbine 120 and an electric generator 125 mechanically coupled therewith. The turbine 120 has a vertical axis 130 of rotation and is adapted to convert air movement into rotational energy. The generator 125 is adapted to generate electrical power from rotational energy of the wind turbine 120 and is preferred to include a three-phase brushless electric generator. A number of pole pairs of the generator 125 may be adapted to expected rotational speeds of the turbine and a desired frequency of a generated electric current. Power of a generator 125 may be fed into a power converter 135 that may be adapted to convert the electrical power in voltage, current, signal form and/or frequency. In another embodiment, one turbine assembly 105 may include its dedicated power converter 135. There may optionally be provided a battery or similar energy storage for receiving the power generated by the system 100.

It is preferred that a turbine assembly 105 may be controlled to run either in a horizontal mode of operation, also called mode A, or in a vertical mode of operation, also called mode B.

In horizontal mode A, naturally occurring wind 140 that may flow around the building 110 may drive a turbine 120 by flowing through or past the turbine 120 in a horizontal direction. The turbine 120 may be of the Savonius type and catch the wind 140 with one or more scoops or aerofoils 145, as will be discussed in more detail below, especially with reference to FIGS. 4A to 4C and 5.

In vertical mode B, a stream 150 of air may be led past a turbine 120 in a vertical direction. To this end, a screening system 155 may be provided that may be operated to enclose a turbine 120 in a structure that resembles a vertical tube, as will be explained in more detail below, with reference to FIG. 3. The air stream 150 may enter the column 115 of turbine assemblies 105 at a lower end and exit at an upper end. Between adjacent turbine assemblies 105 seals 160 may be provided to prevent air loss between screening systems 155. Generally, the generator 125 of a turbine assembly 105 may be disposed radially inside, above or below an associated turbine 120. In vertical mode, conversion of wind energy into electrical power may be conducted by each of the generators 125 or only some of them. In one embodiment, only the topmost generator 125 will convert wind energy into electric energy in vertical mode B.

In yet another embodiment, an additional generator 125 may be provided for operation of the system 100 in vertical mode B. The additional generator 125 may be installed near the top of the column 115 and be adapted to its purpose. Optionally, the additional generator 125 may be coupled to an additional turbine 120 for harvesting wind energy of vertical wind. An axis of rotation of the additional turbine 120 may be vertical or horizontal, requiring a 90° bend in the air duct that includes the column 115.

The screening system 155 and/or the seals 160 may be operated from a control unit 165. The control unit 165 may include an anemometer 170 that is adapted to determine wind 140 speed or direction, and/or a radiation sensor 175 that is adapted to determine solar irradiation. Based on the measurements, and possibly other information, the control unit 165 may determine if it is energetically more advantageous to operate the system 100 in mode A or B and set the mode accordingly. The choice of modes A or B may for instance be made on the basis of an indication of produced energy. The control unit 165 may be connected to the power converter 135 to collect data on provided electric energy.

Solar radiation may be employed to heat the stream of air 150 and the column 115 may act as a chimney to permit vertical air flow past the turbines 120. A wind chamber 180 with a wall or roof 185 that is preferred to be walkable or passable may be provided for heating the stream of air 150. The wind chamber 180 is preferred to be disposed at a lower end of the column 115 and may be under ground as indicated in FIG. 1. The wind chamber 180 is preferred to include an inlet 190 and an outlet 195 on opposing sides of the chamber 180. In one embodiment, the wind chamber 180 extends radially from the column 115, so that the column 115 may effectively be encircled by the wind chamber 180.

The wall or roof 185 is preferred to be adapted to convert solar radiation outside the chamber 180 into heat on the inside. The wall 185 may be of transparent material such as glass or acrylic. Alternatively the wall 185 may be of opaque material, preferably in a dark color on the outside and further preferably with high thermal conductivity. In one embodiment, a transparent wall 185 may be disposed on an outside of an opaque wall 185, so that the wall or roof 185 may be mechanically sturdy and cold to the touch while permitting the heating effect on the inner wall 185. There may be a predetermined gap or space between the two walls 185.

Air may enter the chamber 180 through the inlet 190, get heated from solar radiation and leave as a stream 150 through the outlet 195, passing from there vertically through the column 115 of turbine assemblies 105. In one embodiment, the screening system 155 may be adapted to support heating the vertically flowing air inside the column 115, especially by converting solar irradiation on the outside into heat on the inside.

Figure 2:
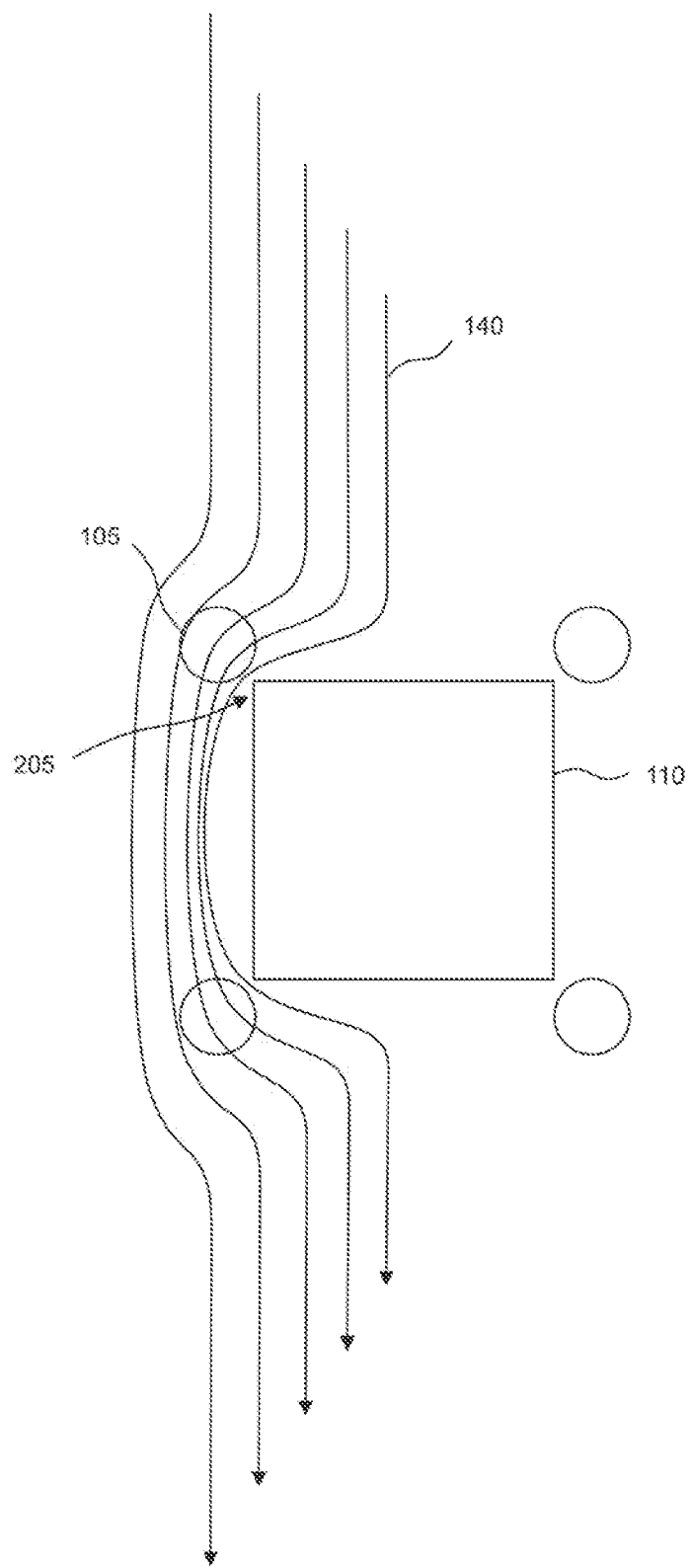
FIG. 2 shows an exemplary air flow around a building.

FIG. 2 shows a top view of an exemplary building 110 around which wind 140 is flowing. It can be seen that the generally free laminar flow of the air gets disturbed by the building 110. The building 110 may have a rectangular cross section or otherwise provide a corner 205 that runs in a vertical direction. The corner 205 generally has an angle of ca. 90°, but corners 205 with different angles may also be used. When wind 140 passes around a corner 205, it may get temporarily compressed and accelerated. A turbine assembly 105 that is disposed at a corner 205 may thus be exposed to wind with increased energy, which it may turn into electric energy. Provided energy may be used for powering the building 110 or be fed into a power grid for powering a remote power consumer.

Figure 3:
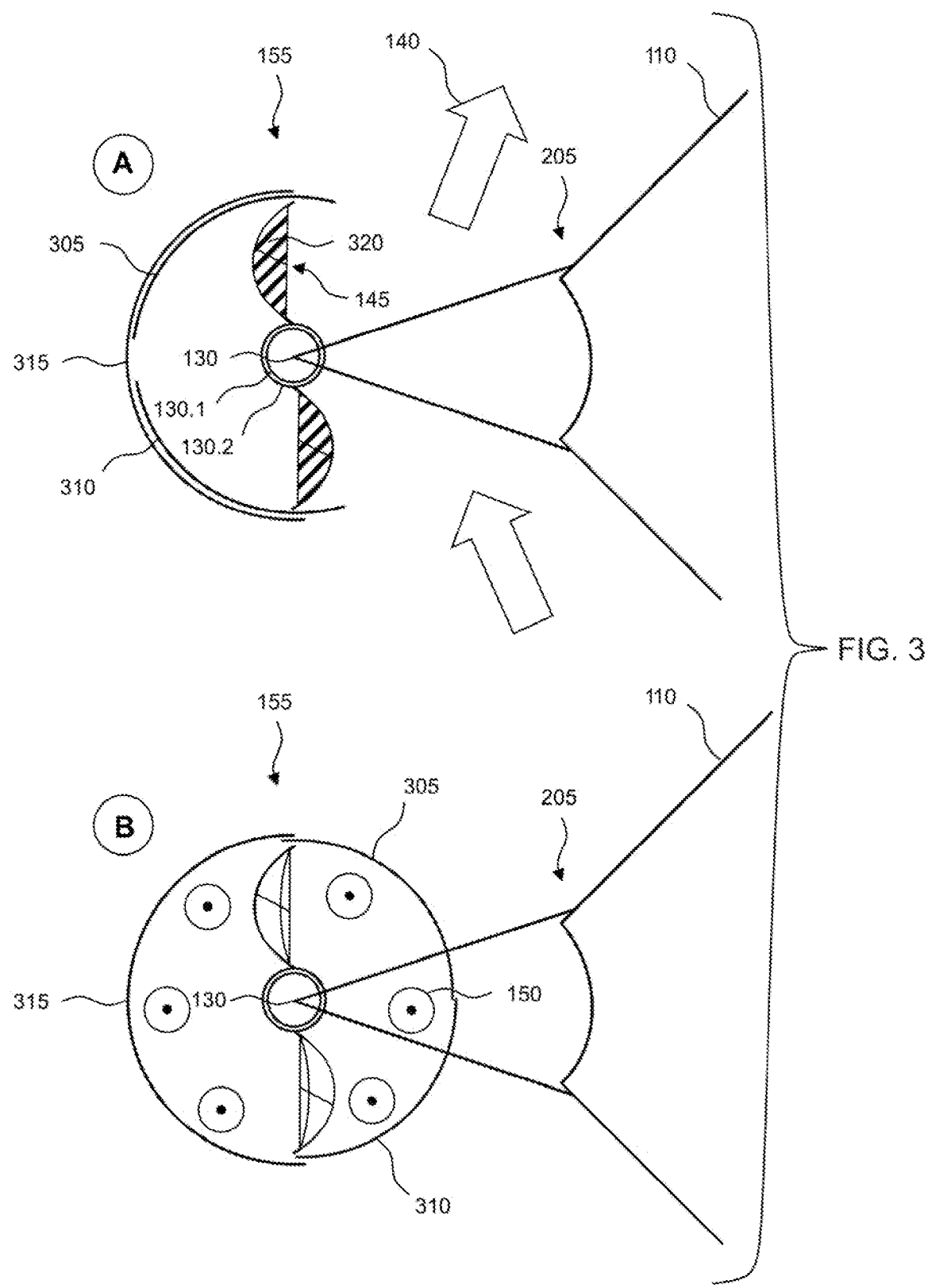
FIG. 3 shows an exemplary wind turbine assembly supporting different modes of operation.

FIG. 3 shows an exemplary wind turbine assembly 105 supporting different modes of operation. The depicted views represent cross sections perpendicular to the axis of rotation 130. Visible in this section are a stator 130.1 and a rotor 130.2 of the electric generator 125. The turbine assembly 105 is preferred to be part of a system 100 with a vertical column 115 of several turbine assemblies 105. In an upper section of FIG. 3 the turbine assembly 105 is shown in a configuration for a horizontal mode of operation A, and in a lower section in a configuration for a vertical mode of operation B.

In the given embodiment, the turbine system 105 includes a screening system 155 which includes a first moveable screen 305, an optional second moveable screen 310 and optionally a static screen 315. Other embodiments may employ different configurations of static 315 and/or moveable screens 305, 310. Each screen 305-315 is preferred to extend along the vertical axis of rotation 130 and enclose the turbine 120 circularly on a predetermined circular segment. Moveable screens 305, 310 may be rotated around axis 130. Presently, static screen 315 covers ~180° and the two moveable screens 305, 310 each cover ~90°. The moveable screens 305, 310 may be curved along different radiuses than the static screen 315—and potentially different from each other—such as to permit positioning them with radial overlap as indicated in FIG. 3.

In horizontal mode A, a moveable screen 305, 310 may be brought into a position where it horizontally extends the circular segment covered by the static screen 315. Wind 140 entering or leaving the turbine assembly 105 may pass through a gap between the building 110 and an edge of one of the moveable screens 305, 310. The screens 305, 310 may be moved so that a gap width or direction is adapted to present requirements. The gap may be controlled to be larger when there is little wind 140 or smaller in high wind 140 situations. In another embodiment, screens 305-315 may be configurable to let the wind 140 pass on a side of the turbine 120 that is facing away from the building 110.

In vertical mode B, the moveable screens 305, 310 may be brought into positions where they extend the circular segment covered by the static screen 315 to a full circle, so that the turbine 120 is effectively enclosed in a tube that is shaped from the screens 305-315. Aerofoils 145 are preferred to be helically shaped so that they may alternatively catch horizontal wind 140 or the vertical stream of air 150.

FIG. 3 shows another optional detail. A stiffening 320, preferably of sickle, circle segment or half moon shape, may be used to increase stability of an aerofoil 145. The views in FIG. 3 are by way of example made at or above such a stiffening 320. The stiffening 320 may lie in a plane perpendicular to the axis of rotation 130 and help prevent bending of the air foil 145 under forces of the wind 140. When the turbine assembly 105 is operated in vertical mode B, the stiffening 320 may be flipped into a vertical position to keep it from disturbing the vertical stream of air 150. In one embodiment the stiffening 320 is shaped with a wing like profile so that it creates a rotation force on the turbine 120 when the stiffening 320 is in the vertical position and subjected to a vertical air flow 150. The profile may include a convex surface along which the uprising air passes so that a force perpendicular to the surface is created. An opposite surface of the stiffening 320 may be flat or concave to increase the force. The member may act like an aileron on the turbine 120. The force may be employed to spin the turbine 120 in mode B to reduce its aerodynamic drag. A number of stiffenings 320 per aerofoil 145 may be chosen.

It is expected that a rotation speed of the turbine 120 is higher when operated in horizontal mode A than when operated in vertical mode B. An actuator for moving the stiffening 320 between horizontal and vertical positions may therefore be disposed on the turbine 120 and rely on centrifugal forces. Should the rotation speed exceed a first threshold, a centrifugal force on a dead weight may be large enough to flip the stiffening 320 from the vertical into the horizontal position. The dead weight may be loaded with an elastic member, pulling it back towards the axis of rotation 130 against the acting centrifugal forces. Should the turning speed of the turbine 120 fall under a second threshold, which may be lower than the first threshold, force of the elastic element may exceed the centrifugal forces and the dead weight is pulled back radially, thereby flipping back the stiffening 320 into the vertical position. The actuator is preferred to be adapted to effect movement of the stiffening 320 between extreme horizontal and vertical positions and avoid positions in between. The actuator may be implemented with passive components only, so that no external energy and no sophisticated control system may be required. The mechanism is indicated in FIG. 3 by an inclined connection between the stiffening 320 and the adjacent aerofoil 145. The wing-like profile of the stiffening 320 can best be viewed in mode B, depicted in the lower portion of FIG. 3. Other actuators, especially of the active type, are also possible. Several stiffenings 320 may be mechanically linked, optionally across aerofoils 145, and be operated through one common actuator.

Figure 4A:
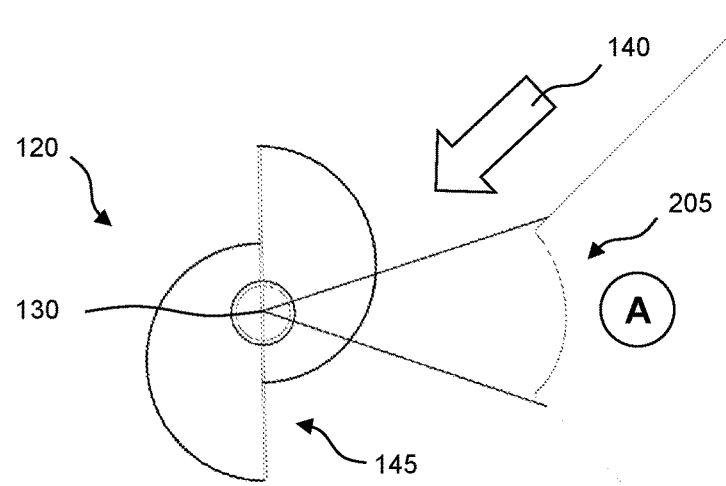
FIGS. 4A to 4C show a wind turbine assembly according to another embodiment.
Figure 4B:
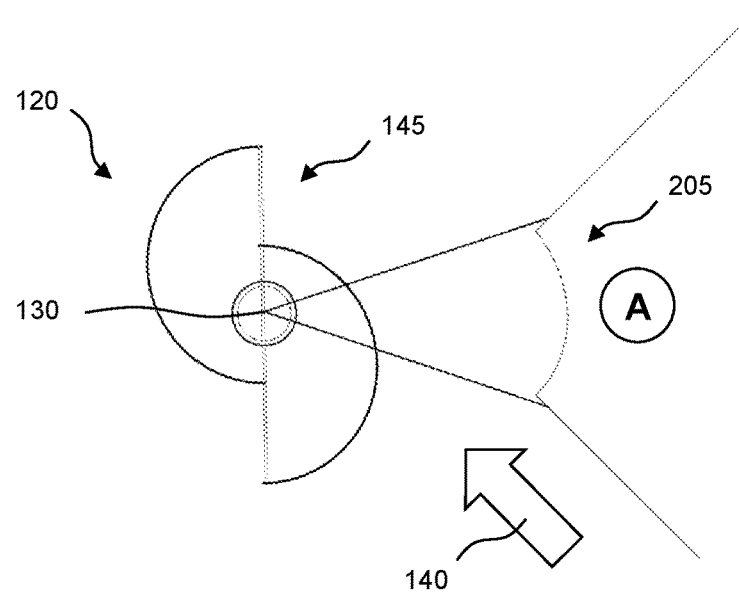
Figure 4C:
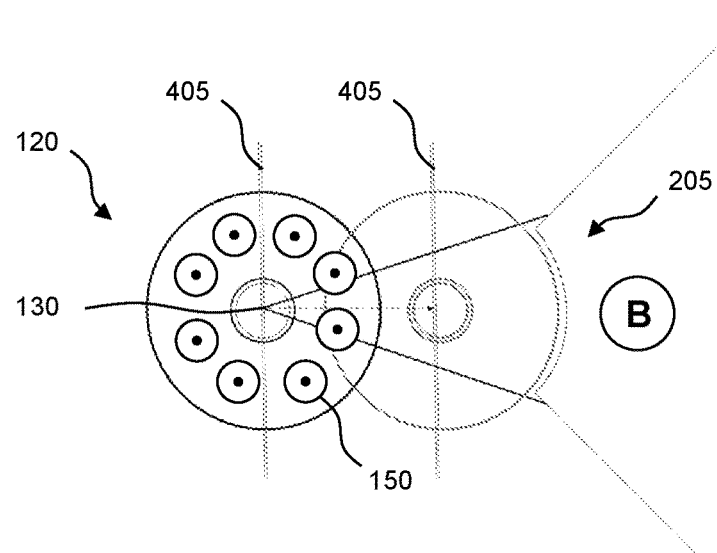

FIGS. 4A to 4C show an exemplary wind turbine 120 according to another embodiment in an axial view. Present turbine 120 includes two scoops 145 that each have a generally semi-circular cross section. Each scoop 145 may be shaped roughly like one section of a hollow cylinder cut in halves along its vertical axis. The scoops 145 may both be moved in opposing directions along an axis that is perpendicular to the axis of rotation 130. This may be effected through use of a spindle drive 405. The employed mechanism is preferred to effect exactly opposing radial movements of both scoops 145 so that rotational forces of the turbine 120 remain in an equilibrium. The mechanism is also preferred to be self locking so that centrifugal forces need not be counteracted by an actuator. Alternatively to the spindle drive, a chain drive, a pair of hydraulic actuators or another means of controlling a radial distance of a scoop 145 to the axis of rotation 130 may be used.

FIG. 4A shows the turbine 120 in a horizontal mode A in a first configuration. The scoops 145 are in relative positions that favor catching wind 140 from an upper right direction. FIG. 4B shows the same turbine 120 in a second configuration, where the scoops 145 are in opposing relative positions that favor catching wind 140 from a lower right direction. While the turbine 120 according to the first configuration may be inclined to turn in a clockwise direction, it may be inclined to turn counter clockwise in the second configuration. Relative displacements between scoops 145 may be considered positive in the first configuration and negative in the second configuration, or vice versa.

FIG. 4C shows the turbine 120 in a third configuration where the scoops 145 are directly opposing so that radial wind 140 may not enter it and a vertical air stream 150 may be kept inside. This position may be assumed to protect the turbine 120, e.g. when there are strong winds, a hailstorm or extremely elevated or low temperatures. The turbine 120 may thus be operated in vertical mode B. Relative displacements of the scoops 145 may be considered zero. The turbine 120 may be very compact in its cross section in this configuration, it may therefore be moved closer to the building's 110 corner 205. In one embodiment there is provided a mechanism for moving the turbine 120 to and from the building 110 in answer to space requirements of the turbine, which may vary in different configurations of its scoops 145, depending on the mechanism used for controlling scoop 145 displacement.

Figure 5:
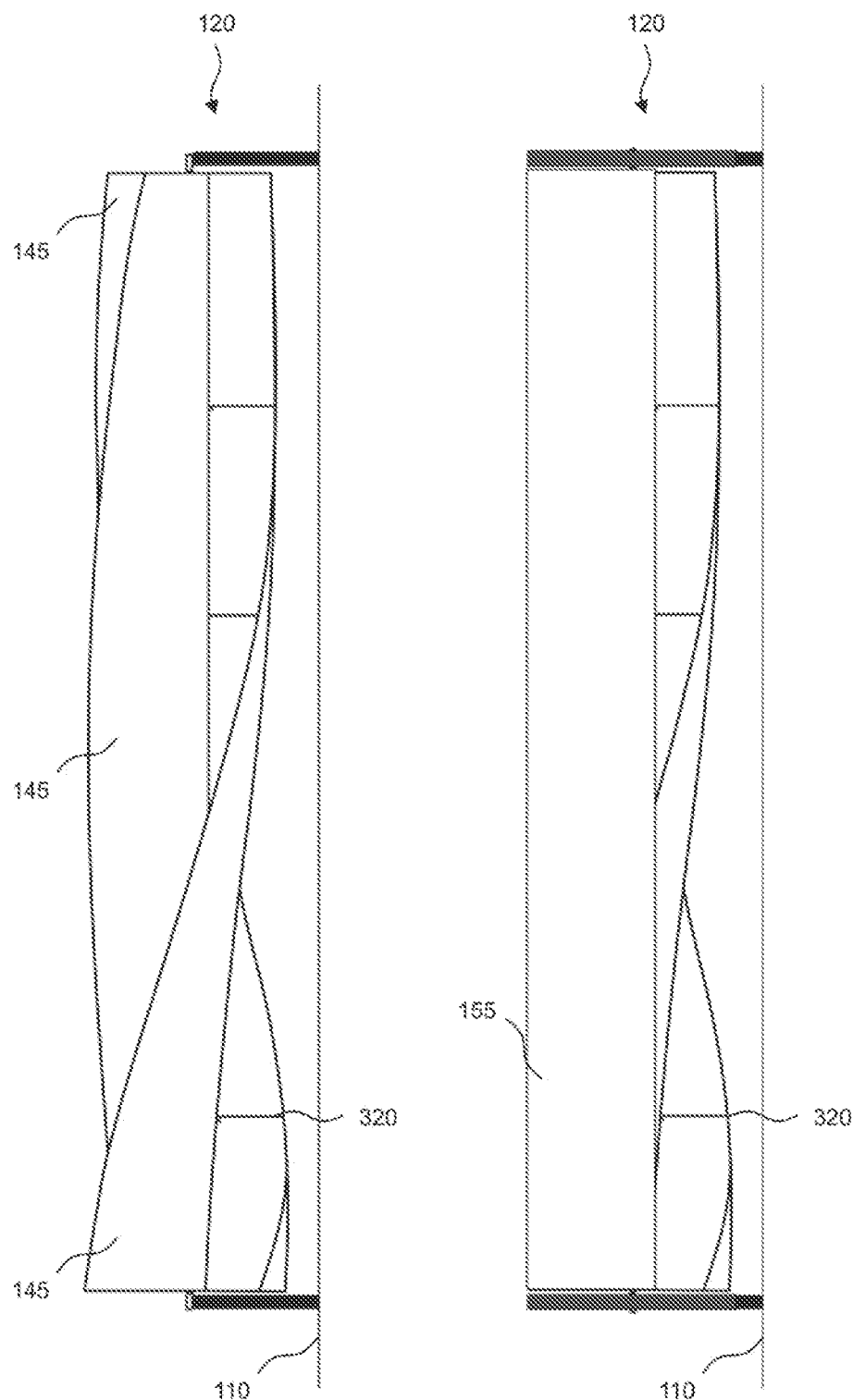
FIG. 5 shows an exemplary turbine.

FIG. 5 shows exemplary turbines 120 of the Savonius type according to another embodiment. Present turbine 120 includes two aerofoils 145 in helical shape. In a left section of FIG. 5 the turbine 120 is uncovered. In a right section of FIG. 5 the turbine 120 is partly covered by a screening system 155. Optional stiffenings 320 are in horizontal orientation for operation in horizontal mode A.

Figure 6:
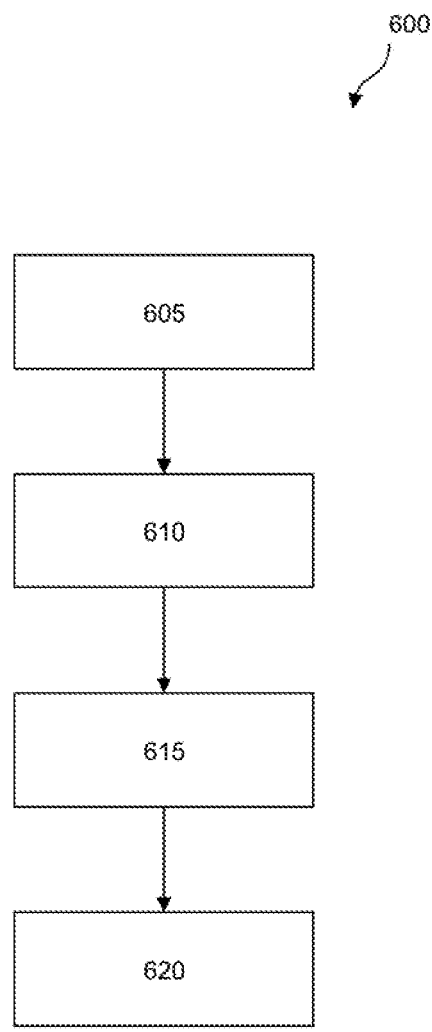
FIG. 6 shows a flow chart of an exemplary method.

FIG. 6 shows a flow chart of an exemplary method 600 which may be used to operate a system 100 having, preferably, one or more turbine assemblies 105. In a step 605, the force of a horizontal wind 140 may be determined. This may be done on the basis of a wind speed determined through anemometer 170, for example. A steadiness of the wind speed, a wind temperature and/or a load of the wind with sand or debris may also be determined. Another source of information, especially a weather report, may also be consulted for determining prospects of local wind 140.

In a step 610 a solar irradiation may be determined, preferably through radiation sensor 175. Optionally, a time of day may be determined and from it an apparent movement of the sun with respect to the system 100 may be calculated. From this movement a forecast may be determined of how much solar radiation is likely to occur around the system 100 in the future. A geographic position of the system 100 and a time of year may be considered for this determination.

In a step 615 a mode of operation may be determined. Especially, it may be determined if it is more efficient to operate the system 100 in horizontal mode A or in vertical mode B. The chosen mode may then be effected in a step 620. To this end, screens 305, 310 of a screening system 155, a seal 160, a spindle drive 405 or a corresponding actuator for adjusting relative positions of scoops 145, an actuator for a stiffening 320, a generator 125 and/or the power converter 135 may be controlled. Electric energy may then be harvested. Control is preferred to maximise energy yield of system 100, and optionally limit it to a predetermined maximum. Another object of the control may be to keep the flow of harvested energy steady. Method 600 may be executed in a loop, starting back at step 605.

Even though the present invention has been illustrated and explained in detail above with reference to the preferred embodiments, the invention is not to be construed as limited to the given examples. Variants or alternate combinations of features given in different embodiments may be derived by a subject matter expert without exceeding the scope of the present invention.

REFERENCE NUMERALS

100 system
105 turbine assembly
110 building
115 column
120 turbine
125 generator
130 axis of rotation
135 power converter
140 wind
145 scoop, aerofoil
150 stream of air
155 screening system
160 seal
165 control unit
170 anemometer
175 radiation sensor
180 wind chamber
185 wall or roof
190 inlet
195 outlet
205 corner
305 first screen (moveable)
310 second screen (moveable)
315 third screen (static)
320 stiffening
405 spindle drive
600 method
605 determine horizontal wind
610 determine solar irradiation
615 determine mode of operation and optimal screens position
620 operate screens, harvest energy

What is claimed is:

1. A turbine assembly comprising:
   a wind turbine defining a first axis as a vertical axis of rotation;
   an electric generator operatively connected to said wind turbine and configured to generate electrical power from rotational energy of said wind turbine;
   said wind turbine being configured to be driven by radial wind transverse to said vertical axis and to be driven by air passing along said vertical axis;
   said turbine assembly having a predetermined length measured along said first axis and said turbine assembly including:

a first curved screen configured to shield wind to or from said wind turbine and being at a constant radius from said first axis along said length;

a second curved screen configured to shield wind to or from said wind turbine in a radial direction and being at a constant radius from said first axis along said length;

said first screen being movable around said first axis from a first position whereat said first and second curved screens conjointly define an opening to admit wind to said wind turbine to a second position whereat said first and second screens conjointly define a closed tube such that wind to or from said wind turbine is blocked in all radial directions; and, said closed tube defining a vertical conduit to accommodate said air passing along said vertical axis to drive said wind turbine when said first screen is in said second position.

2. The turbine assembly of claim 1, wherein said wind turbine is a Savonius type turbine.

3. The turbine assembly of claim 1, wherein said wind turbine is of helicoid shape.

4. The turbine assembly of claim 1, further comprising said turbine assembly being configured to be mounted along a vertical corner of a building.

5. The turbine assembly of claim 1, further comprising said turbine assembly being configured to be mounted along a wall of a building.

6. The turbine assembly of claim 1, further comprising:
a wind chamber having a wall or roof configured to collect solar radiation for heating air in said wind chamber; and,
said wind chamber having an air inlet and an air outlet leading to a lower end of said turbine assembly.

7. A turbine assembly comprising:
a wind turbine defining a first axis as a vertical axis of rotation;
an electric generator operatively connected to said wind turbine and configured to generate electrical power from rotational energy of said wind turbine;
said turbine assembly being configured to be mounted along a vertical corner of a building;
a first screen configured to shield wind to or from said wind turbine in a radial direction;
said first screen being moveable around said first axis;
said first screen being moveable around said first axis such that wind to or from said wind turbine is blocked in all radial directions;
said wind turbine being configured to be propelled by vertical wind;
a wind chamber having a wall or roof configured to collect solar radiation for heating air in said wind chamber; and,
said wind chamber having an air inlet and an air outlet leading to a lower end of said turbine assembly.

8. A system comprising:
a plurality of wind turbine assemblies stacked vertically to form a column; and, each of said wind turbine assemblies including:
a wind turbine having helicoid turbine blades and defining a first axis as a vertical axis of rotation;
an electric generator operatively connected to said wind turbine and configured to generate electrical power from rotational energy of said wind turbine;
said turbine assembly being configured to be mounted along a vertical wall of a building;

each of said wind turbine assemblies having a predetermined length measured along said first axis and each of said turbine assemblies including:
a first curved screen configured to shield wind to or from said wind turbine and being at a constant radius from said first axis along said length;
a second curved screen configured to shield wind to or from said wind turbine in a radial direction and being at a constant radius from said first axis along said length;
said first screen being movable around said first axis from a first position whereat said first and second curved screens conjointly define an opening to admit wind to said wind turbine to a second position whereat said first and second screens conjointly define a closed tube such that wind to or from said wind turbine is blocked in all radial directions; and,
said turbine assemblies being stacked one upon the other so as to cause the respective tubes to conjointly define a vertical conduit to permit the passage of air through said conduit to simultaneously drive the respective wind turbines of said wind turbine assemblies when said first screen is in said second position.

9. The system of claim 8, wherein said turbine assemblies are configured to be mounted along a vertical corner of said building.

10. The system of claim 8, wherein said turbine assemblies are configured to be mounted along a wall of said building.

11. The system of claim 8, further comprising:
a wind chamber having a wall or roof configured to collect solar radiation for heating air in said wind chamber; and,
said wind chamber having an air inlet and an air outlet leading to a lower end of said vertical conduit.

12. A method for operating a wind turbine assembly; and, said wind turbine assembly including: a wind turbine having helicoid turbine blades and defining a first axis as a vertical axis of rotation; an electric generator operatively connected to said wind turbine and configured to generate electrical power from rotational energy of said wind turbine; said turbine assembly being configured to be mounted along a vertical wall of a building; said wind turbine assembly having a predetermined length measured along said first axis and said turbine assembly including: a first curved screen configured to shield wind to or from said wind turbine and being at a constant radius from said first axis along said length; a second curved screen configured to shield wind to or from said wind turbine in a radial direction and being at a constant radius from said first axis along said length; said first screen being movable around said first axis from a first position whereat said first and second curved screens conjointly define an opening to admit wind to said wind turbine to a second position whereat said first and second screens conjointly define a closed tube such that wind to or from said wind turbine is blocked in all radial directions; and, said turbine assembly being mounted so as to define a vertical conduit to permit the passage of air through said conduit to drive the wind turbine of said wind turbine assembly when said first screen is in said second position, the method comprising the steps of:
determining a horizontal wind speed; and,
in response to a predetermined horizontal wind speed, moving said first screen of said wind turbine assembly from said first position whereat horizontal air flows to the wind turbine for an operation thereof in a first operating mode to said second position whereat a passage of air is conducted through said conduit to the wind turbine for operation thereof in a second operating mode.

\* \* \* \* \*